Oct. 27, 1925.
J. H. BECKER
1,559,063
PRESSURE RESPONSIVE DEVICE
Filed Sept. 10, 1923
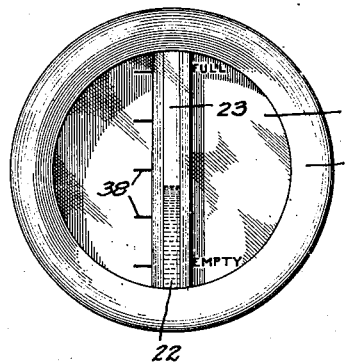
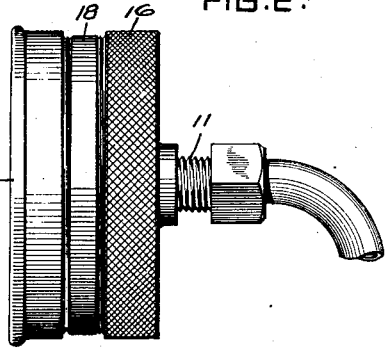
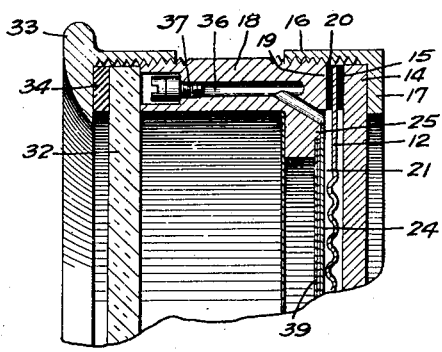
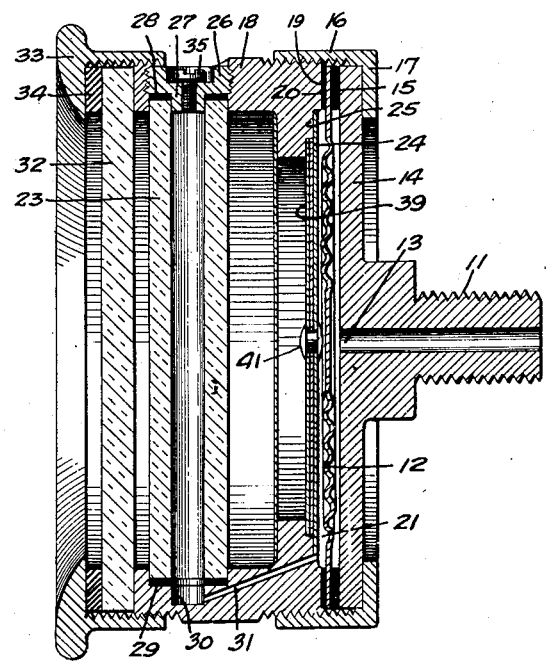
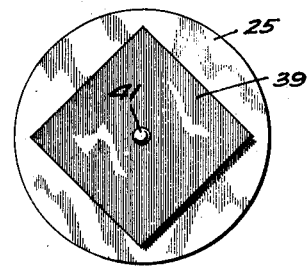
INVENTOR
Julius H. Becker Patented Oct. 27, 1925.

1,559,063

UNITED STATES PATENT OFFICE.

JULIUS H. BECKER, OF SAN FRANCISCO, CALIFORNIA, ASSIGNOR, BY MESNE ASSIGNMENTS, OF ONE-HALF TO AMERICAN RESEARCH AND DEVELOPMENT COMPANY, A CORPORATION OF DELAWARE.

PRESSURE-RESPONSIVE DEVICE.

Application filed September 10, 1923. Serial No. 661,788.

*To all whom it may concern:*

Be it known that I, JULIUS H. BECKER, a citizen of the United States, and a resident of the city and county of San Francisco, in the State of California, have invented a new and useful Pressure-Responsive Device, of which the following is a specification.

This invention relates to a device that responds to gas or liquid pressure, such as may be incorporated in an instrument for indicating pressures.

In many such pressure indicators, the pressure responsive device consists of a container adapted to be influenced by a source of pressure, the space defined by the container being variable in accordance with variations in the pressure to which it is subjected. One familiar example of such an arrangement is the conventional Bourdon gauge in which a dead-ended, curved tube forms the container; and another arrangement is a diaphragm gauge, in which there is a chamber having one wall formed of a flexible diaphragm subjected to a fluid pressure. In such gauges variations in temperature at the gauge cause corresponding errors in indication, due to the fact that the form of the container is also a function of the temperature to which it is subjected. It is one of the objects of the invention to compensate for such errors, and for any others due to temperature in these pressure responsive devices.

It is still another object of the invention to provide a reliable and simple pressure gauge of improved construction.

In one type of gauge the indications are produced by the use of a space containing liquid, the volume of which space is varied in accordance with the pressure variations. In such a construction the temperature expansion of the liquid will introduce an error, and it is another object of my invention to compensate for this effect.

The invention possesses other advantageous features, some of which with the foregoing, will be set forth at length in the following description, where I shall outline in full that form of the invention which I have selected for illustration in the drawings accompanying and forming part of the present application. Although I have shown in the accompanying drawings but one embodiment of my invention, it is to be understood that I do not desire to be limited thereto, since the invention as expressed in the claims may be embodied in many other forms.

Referring to the drawings:

Figure 1 is a front view of a pressure gauge of the diaphragm type embodying the invention;

Fig. 2 is a side view of the same;

Fig. 3 is an enlarged sectional view taken through a vertical plane of Fig. 1;

Fig. 4 is a fragmentary sectional view, similar to Fig. 3 but taken along a different plane, so as to illustrate a feature of the construction not shown in Fig. 3; and Fig. 5 is an elevation of one of the walls of the container and illustrates the mode in which the compensating element is supported thereon.

In the present instance I illustrate the invention as applied to a diaphragm type of gauge. The fluid or gas under pressure is conducted to the instrument through a tube connection 11, and is caused to influence a diaphragm 12 placed opposite the opening 13 of the connection 11. I have shown in the present instance a corrugated diaphragm 12 in order to increase its flexibility, but of course this feature does not form an essential portion of my invention.

There is a confined space formed between the diaphragm 12 and an end plate 14 into which the fluid under pressure may enter. To define this space, use is made of a gasket 15 and of a clamping ring 16. This ring has a flange 17 which cooperates with the plate 14 to urge it against the gasket 15. The ring 16 is threaded on a body member 18 of ring form, so that it may be tightened against the plate 14. The member 18 has a seat or flange 19 that serves as a support for the diaphragm 12. Between the seat 19 and the diaphragm a spacer 20 may be inserted if desired.

As thus far described, it is evident that variations in fluid pressure existing at the right of the diaphragm 12 will cause it to be flexed or bowed out toward the left by a varying amount. The movement of the diaphragm 12 may be made use of in many ways to provide an indication. In the present instance these variations are caused to affect the volume of a space 21 in back of the diaphragm 12, which space contains a liquid 22. Variations in the volume of this space cause variations in the amount of liquid it can hold, the liquid forced out of the space entering a device such as a gauge glass 23 open at the top. Variations in the level of the liquid in the gauge glass give the desired indications.

In the present instance the space 21 is defined by the diaphragm 12 and by a thin metallic plate 24 fastened to a shoulder 25 in the body member 18. The gauge glass 23 is supported in a diametric position in the body ring 18, by the aid of the headless screw 26 which has a projection 27 fitting into the glass 23. A packing washer 28 ensures a tight fit between the glass tube and the shoulder on the bottom of screw 26. A similar washer 29 at the bottom of the tube 23 is utilized, so that a tight fit may be had between the tube and the aperture 30. This aperture, with aperture 31 serves to connect the interior of the tube with the confined space 21.

A glass dial 32 is placed as a cover over the ring 18, through which the tube 23 may be sighted. This dial may be held in place by the aid of the flanged ring 33 which may be of suitable ornamental configuration, and is threaded onto the ring 18. A gasket 34 may if desired be interposed between the ring 33 and the glass dial.

The indicating liquid with which the chamber 21 is charged, is a non-evaporable liquid, such as heavy lubricating oil, and the gauge glass 23 is normally open to the atmosphere at the top. For the purpose of preventing loss of liquid during shipment or handling of the device, the aperture in the screw 26 is closed by a screw 35, which is removed after the device has been installed. When the device is installed on an automobile in which the gasoline is forced from the supply tank to the carburetor by pressure, which is usually produced by a hand pump installed on the dash, the air tube leading from the pump to the tank, is connected to the aperture in the screw 26, so that the artificially produced pressure is equalized on both sides of the liquid. A passage 36 (Fig. 4) communicating with the chamber 21 is provided to permit the escape of air when the chamber is being filled and is normally closed by a small screw 37.

A gauge of this type I find especially useful for indicating the amount of liquid in a container, in which case the gravity head of this liquid is used to produce the operating pressure of the gauge. Thus for instance the indications 38 (Fig. 1) on dial 32 may show the amount of gasoline in a tank located on an automobile, the instrument itself being mounted on the dash.

Means are provided for compensating the indicator for varying atmospheric temperature conditions, in order that the indicator may at all times give an accurate reading. An increase in temperature causes an expansion of the indicating liquid, and unless this expansion is compensated for, the liquid would rise in the tube 23 and indicate a false reading. The reverse, with the same result, is true of a decrease in temperature. The expansion of the metal of the instrument will slightly compensate for the expansion of the liquid, but not sufficiently to obviate error in the indicator reading.

In accordance with my invention I provide means for varying the volume of the liquid containing chamber 21 in accordance with temperature variations, so that the expansion of the liquid is compensated for. The compensating device is so constructed, that, the pressure at the source remaining the same, usual or normal atmospheric or environment temperature changes, will not cause a change of the reading of the indicator. This means comprises a bi-metallic thermostat plate 39, secured at its center to the center of the thin wall 24 by the rivet 41. The plate 39 is preferably square, the corners thereof bearing against a shoulder on the casing, and the central portion thereof being free to flex or bow under temperature changes. The plate 39 is arranged to bow away from the diaphragm 12 for an increase in temperature and move toward the diaphragm for a decrease in temperature. On an increase in temperature therefore, the wall 24 is moved to increase the volume of the chamber 21, and on a decrease in temperature the wall 24 is moved to decrease the volume of the chamber. The amount of change of volume of the chamber, due to the expansion or contraction of the metal casing and due principally to the movement of the wall 24 is equal to the change in volume of the indicating liquid, so that the indicator reading is not influenced by temperature changes.

I claim:

1. A pressure responsive device comprising a casing having a pressure chamber therein, an indicating liquid chamber, a flexible impervious wall separating said chambers whereby variations in pressure in the pressure chamber cause variations in capacity of the indicating liquid chamber and means for changing the capacity of the indicating liquid chamber to compensate for variations in volume of the liquid due to temperature changes.

2. A pressure responsive device comprising a casing provided with a pressure chamber and an indicating liquid chamber, an indicator connected to the latter chamber, means whereby variations of pressure in the first chamber produce variations in capacity of the second chamber, thus varying the level of the liquid in the indicator and means for compensating for the cubical expansion of the liquid due to an increase in temperature thereof, whereby temperature variations do not affect the level of the liquid in the indicator.

3. A pressure responsive device comprising a casing provided with a pressure chamber and an indicating liquid chamber, a movable wall separating said chambers, movement of said wall serving to vary the capacity of said second chamber, a second movable wall defining said second chamber and temperature actuated means for moving said second wall.

4. A pressure responsive device comprising a casing provided with a pressure chamber and an indicating liquid chamber, a movable wall separating said chambers, movement of said wall serving to vary the capacity of said second chamber, a second movable wall defining said second chamber and a thermostat arranged to move said second wall to cause an increase in temperature to produce an increase in the capacity of said second chamber.

5. In a pressure responsive device, a casing having an indicating liquid chamber, means operative by variations in pressure for varying the capacity of said chamber and means operative by variations in temperature for varying the capacity of said chamber.

6. A pressure responsive device comprising a casing provided with a pressure chamber and an indicating liquid chamber, a glass tube connected to said latter chamber and in which the indicating liquid rises, a flexible wall separating said chambers whereby variations in pressure in the first chamber produce variations in capacity of the second chamber, a second movable wall defining said second chamber and a thermostat connected to and adapted to move said second wall whereby an increase in temperature of the thermostat moves the second wall to increase the capacity of the indicating liquid chamber.

In testimony whereof, I have hereunto set my hand.

JULIUS H. BECKER.